United States Patent Office 3,168,144
Patented Feb. 2, 1965

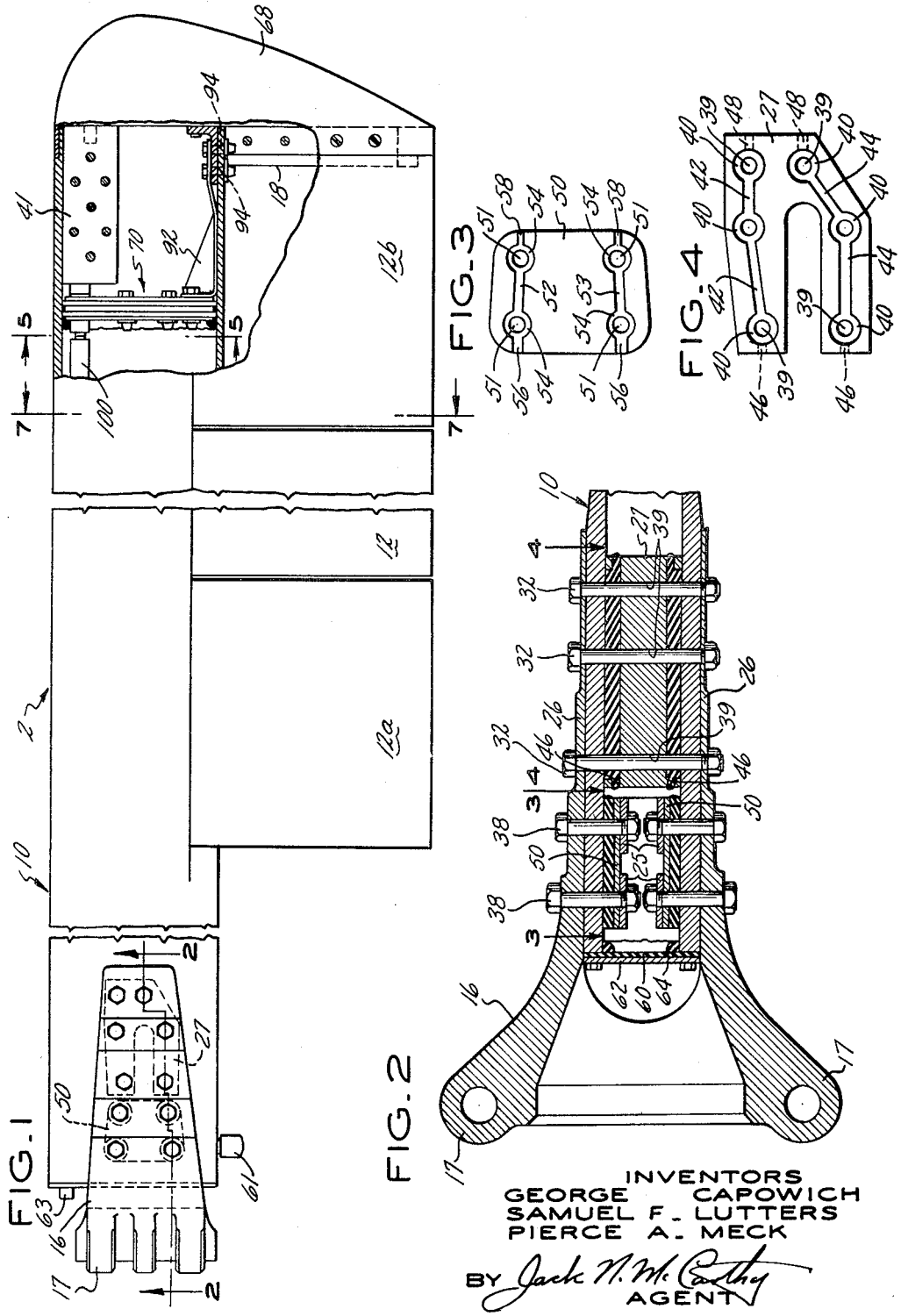

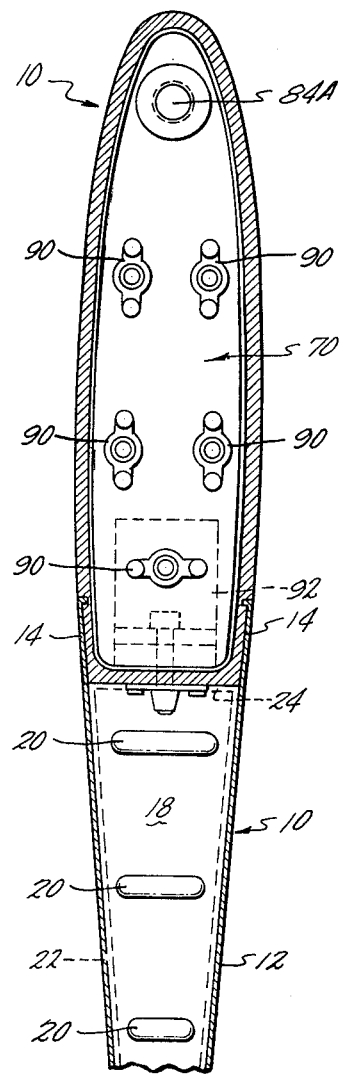
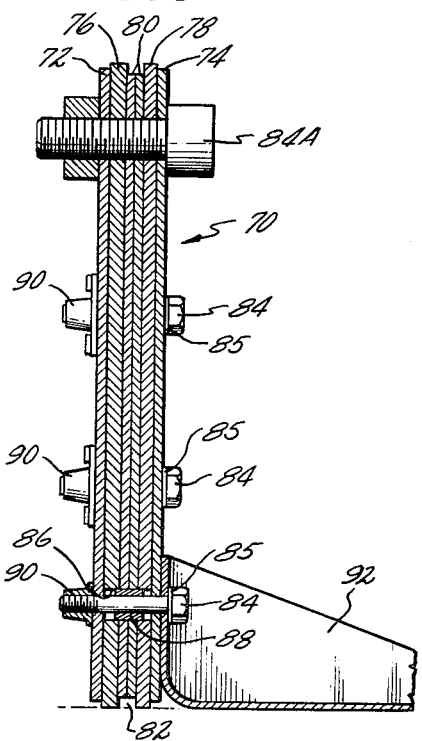
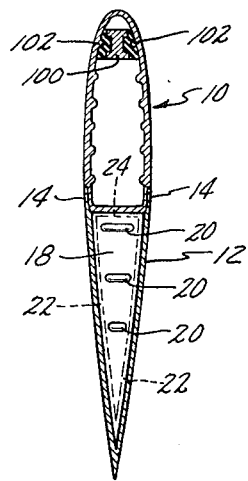

3,168,144
BLADE SEALING MEANS
George Capowich, Shelton, and Samuel F. Lutters, Trumbull, Conn., and Pierce A. Meck, South Salem, N.Y., assignors to United Aircraft Corporation, East Hartford, Conn., a corporation of Delaware
Filed Aug. 31, 1962, Ser. No. 220,684
25 Claims. (Cl. 170—159)

This invention relates to means for sealing a supporting spar or section of a rotor blade so that it can be pressurized.

An object of this invention is to provide a blade for rotary wing aircraft having a spar or other supporting structure which can be pressurized.

Another object of this invention is to provide a blade in which a spar is sealed at its root and by means which includes the sealing of any bolt opening passing through the wall of the spar.

A further object of this invention is to provide a blade having sealing means adjacent to the tip or outboard end of its pressurized section which can be located at a predetermined distance in from the tip.

Another object of this invention is to provide a blade having tip sealing means which can be finally sealed at a predetermined position within the spar of the blade.

A further object of this invention is to provide a blade having a tip sealing means which will be unaffected by the use of weight means in the forward edge of the spar by having a device for transmitting the force of the weights through the tip sealing means to a tip filler or retaining plate.

Another object of this invention is to provide a blade having tip sealing means with layers of resilient material which form a recess around the outer edge thereof for receiving a sealant. Said resilient members being deformable to force the sealant into any area which might permit a leak between the sealing means and inner surface of said spar.

The pressurizing or evacuating of the spar of a rotor blade can be utilized to determine the formation of a crack in the spar which has reached a point where an opening has been formed through the wall. In the case of a pressurized spar, a pressure indicator would indicate a loss of pressure when a crack extended through the spar wall, and if an evacuated spar were being used, a pressure indicator would show an increase in pressure within the spar.

These and other objects and advantages will be apparent from the specification and claims and from the accompanying drawings which illustrate an embodiment of the invention.

FIG. 1 is a top view of a rotor blade with sections removed to show the root and tip ends;

FIG. 2 is an enlarged portion taken along the line 2—2 of FIG. 1 showing the root end of the blade;

FIG. 3 is an enlarged view taken along the line 3—3 of FIG. 2 showing one of the inboard spacers of the root end sealing means;

FIG. 4 is an enlarged view taken along the line 4—4 of FIG. 2 showing the outboard spacer of the root end sealing means;

FIG. 5 is an enlarged view taken along the line 5—5 of FIG. 1 showing the inboard side of the seal assembly without bead of sealer;

FIG. 6 is a sectional view of the seal assembly of the blade tip sealing means shown in FIG. 5; and FIG. 7 is a view along the line 7—7 of FIG. 1 showing a section through the rotor blade.

As viewed in FIG. 1, the rotor blade 2 consists essentially of an extruded metal spar 10 which extends from the root to the tip of the blade and comprises the main structural member as well as the leading edge portion of the blade. While metal has been mentioned, it is to be understood that other materials, such as Fiberglas, can be used. As will be evident from FIGS. 5 and 7, the spar forms a substantial chordwise portion of the blade and conforms to the airfoil contour. The remainder of the chordwise extent of the blade is made up of V-shaped sheet metal pockets, or boxes 12, the upper and lower forward edges 14 of which are adhesively bonded to the upper and lower aft edges of the spar as shown in FIGS. 5 and 7 as in adjacent areas. Each of the pockets 12 is virtually a separate metal box having ribs and end closure members 18, provided with stiffening dimples 20, which are secured at the sides of the pockets by flanges 22 to the upper and lower surfaces of the pockets and by a flange 24 to the flat aft wall of the spar. The pockets are positioned with spanwise gaps therebetween to provide for bending of the blade. Blades of this type are shown in U.S. Patent No. 2,754,917 and U.S. Patent No. 2,754,918. While specific blade structure has been described, it has been done so to provide an environment for the blade sealing means which may be used with other types of blades.

The root end of the blade has a cuff, or retention fitting, 16 attached thereto for use in attaching the blade to a rotor head. The cuff 16 is U-shaped with substantially parallel elements, or plates, 26 which are adapted to be attached to a reinforced root end of a blade spar 10 by through bolts 32 and short bolts 38. The bottom portion of the U-shaped member is formed having two rows of projections 17 which are arranged to meet and engage with mating projections on a rotor head. Pin means fixes one set of projections to the other.

As shown in FIG. 2, the root end of a spar 10 located between the parallel elements or plates 26, of a cuff or retention fitting 16, has an outboard spacer 27 placed within the spar covering the area around each of the through bolts 32. The top and bottom of this outboard spacer is contoured to fit the top and bottom inside surfaces of the spar. The spacer has holes 39 passing therethrough to accommodate each of the through bolts 32. At the top and bottom surface of the outboard spacer, a portion of the spacer is removed around each end of the holes 39 providing an enlarged hole 40 at each end. Each upper and lower forward line of enlarged holes 40 nearer the blade leading edge is connected by a passageway 42 and each enlarged hole 40 in each upper and lower aft line of holes nearer the blade trailing edge is connected by a passageway 44. The holes 39 are spaced in the outboard spacer so that they are coaxial with the openings in the parallel elements 26 for the through bolts. On the inboard end of the outboard spacer 27 a passageway 46 extends through to each of the enlarged holes 40 adjacent that end. On the outboard end of the outboard spacer 27 a passageway 48 extends through to each of the enlarged holes 40 adjacent that end. In assembly, when the through bolts have been torqued to their proper value, an elastomeric sealer, or a paste, is forced into each passageway 46 until its extends from the cooperating passageway or vent 48. This sealer can be a two-part chemically curing elastomeric sealer well known in the art. It will be seen that the sealer will flow around the bolts through the enlarged openings around them and will pass between the bolts through passageways 42 and 44, respectively.

An individual inboard spacer 50 is placed within the spar covering the area around each of the short bolts 38 where they project into the spar. The mating surface of each of the inboard spacers is contoured to fit the respective surface of the spar which it contacts. Each spacer has holes 51 passing therethrough to accommodate each of the short bolts 38. In a manner such as the outboard spacer, these holes are positioned to line up coaxially with the openings in the spar for the short bolts 38. The side of each inboard spacer 50, contoured to fit the spar, has a portion of the spacer removed around the end of the holes 51 providing an enlarged hole 54. The forward line of enlarged holes 54 nearer the leading edge of the blade is connected by a passageway 52 and each enlarged hole 54 in the aft line of holes nearer the trailing edge of the blade is connected by a passageway 53. On the inboard end of each inboard spacer 50, a passageway 56 extends through to each of the enlarged holes 54 adjacent that end. On the outboard end of each inboard spacer 50, a passageway 58 extends through to each of the enlarged holes 54 adjacent that end. In assembly, when the bolts 38 have been torqued to their proper value, a sealer is forced into each passageway 56 until it extends from the cooperating passageway or vent 58. The sealer will flow around the bolts, through the enlarged openings around them, and will pass between the bolts through passageways 52 and 53, respectively.

A root-end plate assembly is fixed to the root end of the spar 10 comprising a gasket 60 and an end plate 62. This gasket and plate can be fixed by any means desired, such as by bolts. In assembly, as the gasket and plate are being placed in position, a bead of the filleting sealer is passed around the inner edge of the root end of the spar, such as at 64. The gasket and plate are then fixed in place against the portion of the bead facing outwardly. Before being fixed in place, a coat of this sealer is also placed on the portion of the gasket that is to contact the spar and around any openings in the gasket which are there to accommodate bolts or any other opening.

A pressure or vacuum indicator 61 is fixed in position in the aft wall of the spar at a point inboard of the inboard pocket 12a. A valve 63 is also provided for conveying a gas under pressure into the spar. In the event a vacuum is used, an appropriate valve would be used.

The tip end of the blade is provided with a cap 68 for enclosing the end of the outboard box 12b and the end of the spar, this cap can also serve to house a blade balancing mechanism. This cap can be attached by any desired means. As shown in FIG. 1, the tip end of the spar 10 has an outboard seal assembly 70 located a short distance into the spar. This outboard seal assembly 70, see FIG. 6, is constructed having a plurality of flat members which are held together as a unit by a plurality of through bolts.

The outboard seal assembly 70 is shaped generally to conform with the contour of the spar at the tip end of the blade. It will be noted that ribs, such as 102, extend through a large portion of the length of the spar. If these ribs or beads extend through to the very tip end of the spar, they can be machined off or otherwise removed to a point inboard of where the seal assembly 70 is to be located. This will obviate the necessity for making the contour of the seal assembly 70 such as to include cutouts on the edges to permit the seal assembly to pass over the ribs or beads. The seal assembly disclosed in this application is one which has been adapted for use in a spar having a smooth inner surface.

Outer flat members 72 and 74 of the seal assembly 70 are rigid metal end plates which have a contour which is slightly under the contour of the inner surface of the spar. For a spar having an inner length of approximately 6.5 inches, this undersize could be in the order of .05 inch. A resilient flat member 76 is located adjacent to the inner flat side of the metal plate 72 and a resilient flat member 78 is located adjacent the inner flat side of the metal plate 74. These flat members are resilient and have a contour which just meets the inner surface of the spar or is barely under the contour of the inner surface of the spar. This undersize could be in the range of .000 to .010 inch.

Between these resilient members 76 and 78, a resilient flat spacing member or members 80 are placed which have a contour which is slightly under the contour of hte outer flat members 72 and 74. This construction of the seal assembly 70 provides a recess 82 around the entire outer edge of the seal assembly which is filled with a sealant, flush with the edges of the resilient members 76 and 78, prior to the installation of the seal assembly.

This seal assembly is held together as a unit by a plurality of through bolts 84. These bolts are spaced around the seal assembly so as to apply even pressure between the plates 72 and 74 as the through bolts are torqued to their proper value when the seal assembly is in its sealing position. The resilient flat members 76, 78, and 80 all have openings 86, for each through bolt 84 to pass therethrough, which are larger than the openings in the plates 72 and 74. This permits a small metal bushing 88 to be located around each through bolt to limit the inner distance to which the plates 72 and 74 can be brought together and provides for equal deformation of the resilient members. As viewed in FIGS. 5 and 6, the lower five bolts have nut plates 90 which are fixed to the outer side of the inboard flat member 72. Blades of the type described above can have a weight, or weights, 100 guided by spanwise beads 102 for blade balance. The outer bolt 84A which is located in the tip of the spar can be a larger bolt (see FIG. 6) when it serves to transmit the force exerted by the tip weights 100 of a spar having such weights to a filler or retaining block 41. This block 41 is fixed in place by a plurality of rivets extending through rivet holes in the spar. Knowing the size of the spar which is to be sealed, this bolt 84A is placed in the assembly so that it meets the end of the weights on one end and meets the filler or retaining block 41 at its other end. Each bolt 84 has a washer 85 on the outboard side. When a larger bolt, such as 84A, is used, it is not necessary to use a bushing 88, such as shown with smaller bolts 84.

The aft end of the seal assembly 70 has a bracket 92 attached thereto by use of the lower through bolt which serves to position the lower end of the seal assembly. This bracket 92 is held at its outboard end by two bolts 94.

*Operation*

In sealing the root end of a blade, an outboard spacer 27 is inserted into the spar 10 so that its openings 39 line up with the openings in the spar. The spar is then placed between the parallel elements 26 of the cuff 16, and these openings are then lined up with those of the spar. The through bolts 32 are then put in place through the elements 26, spar 10, and outboard spacer 27. These bolts are then all properly torqued. The sealer is then forced through each passageway 46 until it extends from the cooperating vent passageway 48 at the outboard end of the spacer. Each inboard spacer is then placed in turn in the root end of the spar 10 and bolted in place by use of the short bolts 38. Washers 25 are used to equalize the pressure placed upon each spacer 50. When these bolts have been properly torqued, sealer is forced into each inner passageway 56 until it extends from the cooperating vent passageway 58. This installation of the spacers and sealer provides a seal for each of the openings placed in the spar for fixing it to the cuff 16. A bead of sealer is placed around the inner edge of the root end of the spar, such as at 64, so that it will engage the gasket 60 when it is put in place. The sealer is also placed on any portion of the gasket or end plate 62 that contacts the spar. The gasket and plate are then fixed in place by bolts extending therethrough into the end of the spar.

In sealing the tip end of a blade, the seal assembly 70, with the bracket 92 attached, has the groove or recess 82 around the outer edge filled with the sealant, flush with the edges of the resilient members 76 and 78, and the inboard side of the seal assembly has a bead of sealant placed at the periphery. A bead of sealer is placed in the spar outboard of the final position of the seal assembly. The seal assembly is then pushed inside the spar to a position which places the groove 82 under the innermost rivet holes. The sealant in the groove 82 is then replenished through said holes. The seal assembly is then pushed further to its sealing position. During installation, the seal assembly is kept parallel to the chord of the blade.

Torque bolts to squeeze the resilient members 76, 78, and 80. This action then forces the contour of the resilient members 76 and 78 against the inner surface of the spar, and the expansion of the resilient member or members 80 reduces the size of the recess 82 forcing the sealant against the inner surface of the spar and against the meeting edge of the spar and the adjacent inner sides of the resilient members 76 and 78. The block 41 is then riveted in place and the free end of the bracket 92 is fixed in position by the bolts 94.

When a bolt 84A is used, the squeezing resilient members 76, 78, and 80, forces them in a sealing movement towards the threads of the bolt.

It is to be understood that the invention is not limited to the specific description above or to the specific figures, but may be used in other ways without departure from its spirit as defined by the following claims.

We claim:

1. A rotor blade comprising:
   (a) a tubular spar,
   (b) sealing means in the end of said spar for maintaining a pressure differential across it,
   (c) said sealing means including:
      (1) resilient means having a relaxed contour which is under the contour of the inner surface of the spar,
      (2) said resilient means having a groove located around its outer periphery,
      (3) sealant located in said groove,
      (4) means deforming said resilient means forcing the contoured edges against the interior of the spar,
      (5) said sealant adhering the outer periphery of said deformed resilient means to the interior of the spar.

2. A rotor blade comprising:
   (a) a tubular spar,
   (b) sealing means in the end of said spar for maintaining a pressure differential across it,
   (c) said sealing means including:
      (1) resilient means having a relaxed contour which is under the contour of the inner surface of the spar,
      (2) said resilient means having a groove located around its outer periphery,
      (3) a sealant located in said groove,
      (4) means deforming said resilient means forcing the contoured edges against the interior of the spar,
      (5) said deforming means having forced the sealant against the interior of the spar in its uncured state,
      (6) said sealant adhering the outer periphery of said deformed resilient means to the interior of the spar.

3. A rotor blade comprising:
   (a) a tubular spar,
   (b) a sealing dam in said blade within said spar for maintaining a pressure differential across it,
   (c) said dam having:
      (1) outer spaced rigid plates having a contour under the contour of the inner surface of the spar,
      (2) resilient sealing means between said outer spaced rigid plates which has a relaxed contour which is under the contour of the inner surface of the spar but greater than the contour of the rigid plates,
      (3) a groove in the periphery of said resilient spacer means,
      (4) a cured sealant located in said groove,
      (5) means holding said rigid plates with relation to each other at a distance deforming said resilient sealing means,
      (6) said sealing means being forced against the inner surface of the spar by the deforming action between the rigid outer plates,
      (7) said sealant adhering the sealing means to the interior of the spar.

4. A rotor blade comprising:
   (a) a tubular spar,
   (b) a sealing dam in said blade within said spar for maintaining a pressure differential across it,
   (c) said dam having:
      (1) outer spaced rigid plates having a contour under the contour of the inner surface of the spar,
      (2) a first resilient flat member located adjacent the inner side of one rigid plate,
      (3) a second resilient member located adjacent the inner side of the other rigid plate,
      (4) said first and second resilient members having a relaxed contour which is under the contour of the inner surface of the spar but greater than the contour of the rigid plates,
      (5) resilient spacer means between said first and second resilient members which has a relaxed contour which is under the contour of the first and second resilient plates,
      (6) a sealant located between the end of the resilient spacing means and the inner sides of the outer edge of the first and second resilient members,
      (7) means holding said rigid plates at a location deforming said resilient members and spacer means,
      (8) said first and second resilient members being forced against the inner surface of the spar by the deforming action between the rigid outer plates,
      (9) said sealant adhering the first and second resilient members and the spacer means to the interior of the spar.

5. A rotor blade comprising:
   (a) a tubular spar,
   (b) a sealing dam in said blade within said spar for maintaining a pressure differential across it,
   (c) said dam having:
      (1) outer spaced rigid plates having a contour slightly under the contour of the inner surface of the spar,
      (2) a first resilient flat member located adjacent the inner side of one rigid plate,
      (3) a second resilient member located adjacent the inner side of the other rigid plate,
      (4) said first and second resilient members having a relaxed contour which is barely under the contour of the inner surface of the spar,
      (5) resilient spacer means between said first and second resilient members which has a relaxed contour which is slightly under the contour of the outer rigid members,
      (6) a sealant located between the end of the resilient spacing means and the inner sides of the outer edge of the first and second resilient members,
      (7) means holding said rigid plates at a location deforming said resilient members and spacer means,
      (8) said first and second resilient members being forced against the inner surface of the spar by the deforming action between the rigid outer plates,
(9) said sealant adhering the first and second resilient members and the spacer means to the interior of the spar.

6. A rotor blade comprising:
(a) a tubular spar,
(b) a sealing dam in said blade within said spar for maintaining a pressure differential across it,
(c) said dam having:
(1) outer spaced rigid plates having a contour under the contour of the inner surface of the spar,
(2) a first resilient flat member located adjacent the inner side of one rigid plate,
(3) a second resilient member located adjacent the inner side of the other rigid plate,
(4) said first and second resilient members having a relaxed contour which is under the contour of the inner surface of the spar but greater than the contour of the rigid plates,
(5) resilient spacer means between said first and second resilient members which has a relaxed contour which is under the contour of the first and second resilient plates,
(6) a sealant located between the end of the resilient spacing means and the inner sides of the outer edge of the first and second resilient members,
(7) bolt means between said rigid plates forcing them together deforming said resilient members and spacer means,
(8) said first and second resilient members being forced against the inner surface of the spar by the deforming action between the rigid outer plates,
(9) said sealant adhering the first and second resilient members and the spacer means to the interior of the spar.

7. A rotor blade comprising:
(a) a tubular spar,
(b) a sealing dam in said blade within said spar for maintaining a pressure differential across it,
(c) said dam having:
(1) outer spaced rigid plates having a contour under the contour of the inner surface of the spar,
(2) a first resilient flat member located adjacent the inner side of one rigid plate,
(3) a second resilient member located adjacent the inner side of the other rigid plate,
(4) said first and second resilient members having a relaxed contour which is under the contour of the inner surface of the spar but greater than the contour of the rigid plates,
(5) resilient spacer means between said first and second resilient members which has a relaxed contour which is under the contour of the first and second resilient plates,
(6) a sealant located between the end of the resilient spacing means and the inner sides of the outer edge of the first and second resilient members,
(7) a sealant located between the inboard outer edge of the inboard rigid plate and said spar,
(8) means holding said rigid plates at a location deforming said resilient members and spacer means,
(9) said first and second resilient members being forced against the inner surface of the spar by the deforming action between the rigid outer plates,
(10) said sealant adhering the first and second resilient members and the spacer means to the interior of the spar.

8. A rotor blade comprising:
(a) a tubular spar,
(b) a sealing dam in said blade within said spar for maintaining a pressure differential across it,
(c) said dam having:
(1) outer spaced rigid plates having a contour under the contour of the inner surface of the spar,
(2) a first resilient flat member located adjacent the inner side of one rigid plate,
(3) a second resilient member located adjacent the inner side of the other rigid plate,
(4) said first and second resilient members having a relaxed contour which is under the contour of the inner surface of the spar but greater than the contour of the rigid plates,
(5) resilient spacer means between said first and second resilient members which has a relaxed contour which is under the contour of the first and second resilient plates,
(6) a sealant located between the end of the resilient spacing means and the inner sides of the outer edge of the first and second resilient members,
(7) means holding said rigid plates at a location deforming said resilient members and spacer means,
(8) said first and second resilient members being forced against the inner surface of the spar by the deforming action between the rigid outer plates,
(d) means fixing said dam a predetermined distance into said spar,
(9) said sealant adhering the first and second resilient members and the spacer means to the interior of the spar.

9. A rotor blade comprising:
(a) a tubular spar,
(b) a sealing dam in said blade within said spar for maintaining a pressure differential across it,
(c) said dam having:
(1) inboard and outboard spaced rigid plates having a contour slightly under the contour of the inner surface of the spar,
(2) a first resilient flat member located adjacent the inner side of one rigid plate,
(3) a second resilient member located adjacent the inner side of the other rigid plate,
(4) said first and second resilient members having a relaxed contour which is barely under the contour of the inner surface of the spar,
(5) resilient spacer means between said first and second resilient members which has a relaxed contour which is slightly under the contour of the outer rigid members,
(6) a sealant located between the end of the resilient spacing means and the inner sides of the outer edge of the first and second resilient members,
(7) nuts fixed to the inboard side of the inboard rigid plates around the edge thereof,
(8) bolts passing through the outboard rigid plate, first resilient member, resilient spacer means, second resilient member, and the inboard rigid plate engaging each nut,
(9) said nuts and bolts being engaged to pull said rigid plates together to deform said resilient members and spacer means,
(10) said first and second resilient members being forced against the inner surface of the spar by the deforming action between the rigid outer plates,
(11) said sealant adhering the first and second resilient members and the spacer means to the interior of the spar.

10. A blade for a rotary wing aircraft comprising:
(a) a tubular spar,
(b) first means sealing the root end of said tubular spar,
(c) said first means including a plate covering the opening in the root end of said spar,
(d) an elastomeric sealant bonded between said plate and said root end around the inner opening in said root end,
(e) a blade cuff,
(f) bolt means attaching said blade cuff to said root end of said tubular spar,
(g) said bolt means including bolts passing through said spar,
(h) second means sealing each of said bolts with said spar,
(i) third means sealing the tip end of said tubular spar,
(j) valve means for changing the pressure on the interior of said spar,
(k) said spar containing a pressure which differs from the surrounding pressure.

11. A blade for a rotary wing aircraft comprising:
(a) a tubular spar,
(b) first means sealing the root end of said tubular spar,
(c) a blade cuff,
(d) bolt means attaching said blade cuff to said root end of said tubular spar,
(e) said bolt means including bolts passing through said spar,
(f) second means sealing each of said bolts with said spar,
(g) said second means including a member positioned around each bolt forming a chamber around the end of each bolt adjacent the interior of said spar,
(h) each chamber being filled with an elastomeric sealant,
(i) said sealant being bonded to said spar and each respective bolt,
(j) third means sealing the tip end of said tubular spar,
(k) valve means for changing the pressure on the interior of said spar,
(l) said spar containing a pressure which differs from the surrounding pressure.

12. A blade for a rotary wing aircraft comprising:
(a) a tubular spar,
(b) first means sealing the root end of said tubular spar,
(c) a blade cuff,
(d) bolt means attaching said blade cuff to said root end of said tubular spar,
(e) said bolt means including bolts passing through said spar,
(f) second means sealing each of said bolts with said spar,
(g) third means sealing the tip end of said tubular spar,
(h) said third means including a resilient member placed in said spar having a groove around its periphery,
(i) an elastomeric sealant in said groove bonded to said resilient member and to said spar,
(j) valve means for changing the pressure on the interior of said spar,
(k) said spar containing a pressure which differs from the surrounding pressure.

13. A blade for a rotary wing aircraft comprising:
(a) a tubular spar,
(b) first means sealing the root end of said tubular spar,
(c) said first means including a plate covering the opening in the root end of said spar,
(d) an elastomeric sealant bonded between said plate and said root end around the inner opening in said root end,
(e) a blade cuff,
(f) bolt means attaching said blade cuff to said root end of said tubular spar,
(g) said bolt means including bolts passing through said spar,
(h) second means sealing each of said bolts with said spar,
(i) said second means including a member positioned around each bolt forming a chamber around the end of each bolt adjacent the interior of said spar,
(j) each chamber being filled with an elastomeric sealant,
(k) said sealant being bonded to said spar and each respective bolt,
(l) third means sealing the tip end of said tubular spar,
(m) said third means including a resilient member placed in said spar having a groove around its periphery,
(n) an elastomeric sealant in said groove bonded to said resilient member and to said spar,
(o) valve means for changing the pressure on the interior of said spar,
(p) said spar containing a pressure which differs from the surrounding pressure.

14. A rotor blade comprising:
(a) a tubular spar,
(b) a blade retention fitting by which the blade is adapted to be connected to a rotor hub,
(c) said fitting having upper and lower plates between which the root of said spar is receivable,
(d) bolts extending between said upper and lower plates and said spar for fixing said spar to said blade retention fitting,
(e) means located adjacent the inner surface of said spar and around each of said bolts extending through the surface of said spar,
(f) said last-named means having an enlarged opening around each bolt where the means engages the surface of the spar,
(g) an elastomeric sealant in each of said openings sealing the surface of each bolt with said spar.

15. A process for sealing an open end of a tubular spar for a rotary wing having a hole in the side wall comprising:
(a) providing a resilient rubber-like dam device having a contour approximately that of the interior contour of the spar and having a groove around its outer periphery,
(b) placing a continuous bead of uncured sealant around the inner surface of the spar at a location outwardly from the final location of the dam device,
(c) filling the groove around the dam device with an uncured sealant,
(d) pushing the dam into said spar to a position whereby the groove is located in connection with the hole in the side wall of said spar,
(e) replenishing the uncured sealant in said groove with uncured sealant forced through said hole,
(f) pushing the dam to its final position maintaining it perpendicular to the axis of the spar,
(g) squeezing and maintaining the sides of said resilient dam together forcing the edges of the dam and the uncured sealant in the groove against the interior of the spar,
(h) allowing said sealant to cure.

16. A process for sealing an open end of a tubular spar for a rotary wing having a hole in the side wall comprising:
(a) providing a resilient rubber-like dam device having a contour approximately that of the interior contour of the spar and having a groove around its outer periphery,
(b) placing a continuous bead of uncured elastomeric sealant around the inner surface of the spar at a location outwardly from the final location of the dam device, (c) filling the groove around the dam device with an uncured elastomeric sealant,
(d) pushing the dam into said spar to a position whereby the groove is located in connection with the hole in the side wall of said spar,
(e) replenishing the uncured elastomeric sealant in said groove with uncured elastomeric sealant forced through said hole,
(f) pushing the dam to its final position maintaining its perpendicular to the axis of the spar,
(g) squeezing and maintaining the sides of said resilient dam together forcing the edges of the dam and the uncured elastomeric sealant in the groove against the interior of the spar,
(h) allowing said uncured elastomeric sealant to cure.

17. A process for sealing an open end of a tubular spar comprising:
(a) providing a resilient rubber-like dam device having a contour approximately that of the interior contour of the spar and having a groove around its periphery,
(b) filling the groove around the dam device with a sealant,
(c) pushing the dam into position maintaining it perpendicular to the axis of the spar,
(d) squeezing and maintaining the sides of the dam together forcing the edges of the dam and the sealant in the groove against the interior of the spar.

18. A process for sealing an open end of a tubular spar comprising:
(a) providing a resilient rubber-like dam device having a contour approximately that of the interior contour of the spar and having a groove around its periphery,
(b) filling the groove around the dam device with an uncured sealant,
(c) pushing the dam into position maintaining it perpendicular to the axis of the spar,
(d) squeezing and maintaining the sides of the dam together forcing the edges of the dam and the uncured sealant in the groove against the interior of the spar,
(e) curing said sealant.

19. A process for sealing an open end of a tubular spar comprising:
(a) providing a resilient rubber-like dam device having a contour approximately that of the interior contour of the spar and having a groove around its periphery,
(b) filling the groove around the dam device with an uncured elastomeric sealant,
(c) pushing the dam into position maintaining it perpendicular to the axis of the spar,
(d) squeezing and maintaining the sides of the dam together forcing the edges of the dam and the uncured elastomeric sealant in the groove against the interior of the spar,
(e) curing said uncured elastomeric sealant.

20. A process for sealing an open end of a tubular spar comprising:
(a) providing a resilient rubber-like dam device having a contour approximately that of the interior contour of the spar and having a groove around its periphery,
(b) placing a continuous bead of uncured sealant around the inner surface of the spar at a location outwardly from the final location of the dam device,
(c) filling the groove around the dam device with an uncured sealant,
(d) pushing the dam into position maintaining it perpendicular to the axis of the spar,
(e) squeezing and maintaining the sides of the dam together forcing the edges of the dam and the uncured sealant in the groove against the interior of the spar,
(f) curing said sealant.

21. A process for sealing an open end of a tubular spar for a rotary wing having a hole in the side wall comprising:
(a) providing a resilient rubber-like dam device having a contour approximately that of the interior contour of the spar and having a groove around its outer periphery,
(b) filling the groove around the dam device with an uncured sealant,
(c) pushing the dam into said spar to a position whereby the groove is located in connection with the hole in the side wall of said spar,
(d) replenishing the uncured sealant in said groove with uncured sealant forced through said hole,
(e) pushing the dam to its final position maintaining it perpendicular to the axis of the spar,
(f) squeezing and maintaining the sides of said resilient dam together forcing the edges of the dam and the uncured sealant in the groove against the interior of the spar,
(g) curing said sealant.

22. A rotor blade comprising:
(a) a tubular spar having a root end and a tip end,
(b) sealing means in the tip end of said spar,
(c) a retaining block fixed in said spar,
  (1) said block being located between said sealing means and the tip end of said spar,
(d) a weight located in said spar having longitudinal movement therein,
  (1) said weight being located between said sealing means and the root end of said spar,
(e) said sealing means including:
  (1) resilient means having a relaxed contour which is under the contour of the inner surface of the spar,
  (2) said resilient means having a groove located around its outer periphery,
  (3) sealant located in said groove,
  (4) means deforming said resilient means forcing the contoured edges against the interior of the spar,
  (5) said sealant securing the outer periphery of said deformed resilient means to the interior of the spar,
  (6) a load transmitting member extending from each side with one end against said retaining block and the other against said weight.

23. A rotor blade comprising:
(a) a tubular spar,
(b) a sealing dam in said blade within said spar,
(c) said dam having:
  (1) inboard and outboard spaced rigid plates having a contour slightly under the contour of the inner surface of the spar,
  (2) a first resilient flat member located adjacent the inner side of one rigid plate,
  (3) a second resilient member located adjacent the inner side of the other rigid plate,
  (4) said first and second resilient members having a relaxed contour which is barely under the contour of the inner surface of the spar,
  (5) resilient spacer means between said first and second resilient members which has a relaxed contour which is slightly under the contour of the outer rigid members,
  (6) a sealant located between the end of the resilient spacing means and the inner sides of the outer edge of the first and second resilient members,
  (7) nuts fixed to the inboard side of the inboard rigid plates around the edge thereof,
  (8) bolts passing through the outboard rigid plate, first resilient member, resilient spacer means, second resilient member, and the inboard rigid plate engaging each nut,
  (9) said nuts and bolts being engaged to pull said rigid plates together to deform said resilient members and spacer means,
(10) rigid spacing means between said rigid plates limiting the distance to which they can be brought together,
(11) said first and second resilient members being forced against the inner surface of the spar by the deforming action between the rigid outer plates,
(12) said sealant securing the first and second resilient members and the spacer means to the interior of the spar.

24. A rotor blade comprising:
(a) a tubular spar,
(b) a blade retention fitting by which the blade is adapted to be connected to a rotor hub,
(c) said fitting having upper and lower plates between which the root of said spar is receivable,
(d) bolts extending between said upper and lower plates and said spar for fixing said spar to said blade retention fitting,
(e) means located adjacent the inner surface of said spar and around each of said bolts extending through the surface of said spar,
(f) said last-named means having an enlarged opening around each bolt where the means engages the surface of the spar,
(g) a plurality of said enlarged openings being interconnected by a first passageway,
(h) one of the interconnected enlarged openings having a second passageway through which a sealant can be introduced,
(i) another interconnected opening having a third passageway through which a sealant can flow to prevent an entrapment of fluid within the means located adjacent the inner surface of said spar and around each of said bolts,
(j) a sealant in each of said openings and first, second and third passageways.

25. A rotor blade comprising:
(a) a tubular spar which provides a portion of the airfoil contour of the blade,
(b) fairing means secured to the spar for completing the chordwise extent of the blade,
(c) sealing means in one end of said spar for maintaining a pressure differential across it,
(d) a cap enclosing the end of the spar and the fairing means,
(e) said sealing means including:
  (1) resilient means having a relaxed contour which is under the contour of the inner surface of the spar,
  (2) said resilient means having a groove located around its outer periphery,
  (3) sealant located in said groove,
  (4) means deforming said resilient means forcing the contoured edges against the interior of the spar,
  (5) said sealant adhering the outer periphery of said deformed resilient means to the interior of the spar,
(f) second sealing means in the other end of said spar.

References Cited in the file of this patent
UNITED STATES PATENTS

| | | |
|---|---|---|
| 2,304,718 | Swart | Dec. 8, 1942 |
| 2,375,995 | Kaeser | May 15, 1945 |
| 2,686,091 | Young | Aug. 10, 1954 |
| 2,710,113 | Pritchard | June 7, 1955 |
| 2,941,603 | Jovanovich | June 21, 1960 |
| 2,950,766 | Huber | Aug. 30, 1960 |
| 2,959,319 | Mitchell | Nov. 8, 1960 |
| 2,967,573 | Johnson | Jan. 10, 1961 |

UNITED STATES PATENT OFFICE
CERTIFICATE OF CORRECTION

Patent No. 3,168,144                 February 2, 1965

George Capowich et al.

It is hereby certified that error appears in the above numbered patent requiring correction and that the said Letters Patent should read as corrected below.

Column 8, line 32, beginning with "(d) means fixing" strike out all to and including "of the spar," in line 36, same column 8, and insert instead (9) said sealant adhering the first and
           second resilient members and the spacer
           means to the interior of the spar,
   (d) means fixing said dam a predetermined distance into said spar.

Signed and sealed this 29th day of June 1965.

(SEAL)
Attest:

ERNEST W. SWIDER                 EDWARD J. BRENNER
Attesting Officer                  Commissioner of Patents